(12) United States Patent
Pan et al.

(10) Patent No.: US 8,093,829 B2
(45) Date of Patent: Jan. 10, 2012

(54) LAMP DRIVING DEVICE WITH OPEN VOLTAGE CONTROL

(75) Inventors: Yu-Cheng Pan, Chupei (TW); Wei-Chun Yeh, Chupei (TW)

(73) Assignee: Logah Technology Corp., Chupei, Hsinchu County (TW)

( * ) Notice: Subject to any disclaimer, the term of this patent is extended or adjusted under 35 U.S.C. 154(b) by 278 days.

(21) Appl. No.: 12/474,217

(22) Filed: May 28, 2009

(65) Prior Publication Data

US 2010/0301763 A1 Dec. 2, 2010

(51) Int. Cl.
*H05B 41/36* (2006.01)

(52) U.S. Cl. .......... 315/291; 315/307

(58) Field of Classification Search .......... 315/291, 315/224, 296, 274–289, 312, 307
See application file for complete search history.

(56) References Cited

U.S. PATENT DOCUMENTS

| 2003/0057873 A1* | 3/2003 | Suzuki et al. | 315/224 |
| 2006/0284568 A1* | 12/2006 | Chang et al. | 315/282 |
| 2007/0120504 A1* | 5/2007 | Bai et al. | 315/291 |
| 2007/0126372 A1* | 6/2007 | Huang et al. | 315/291 |

* cited by examiner

*Primary Examiner* — Douglas W Owens
*Assistant Examiner* — Amy Yang
(74) *Attorney, Agent, or Firm* — Pai Patent & Trademark Law Firm; Chao-Chang David Pai

(57) ABSTRACT

A lamp driving device with an open voltage control comprises a DC power source, a square wave switch, a square wave controller, an LC resonant circuit, a driver transformer and a current detector; wherein the square wave switch outputs a square wave signal to the LC resonant circuit, the LC resonant circuit converts the square wave signal into a sinusoidal wave signal and outputs the sinusoidal wave signal to the driver transformer, and finally the driver transformer drives the lamp and the current detector is used to detect the operation of the lamp, and, if the lamp is found open-circuit, a PWM control pin will control the square wave controller to stop the operation of the lamp driving device, thereby enhancing safety in using the lamp.

4 Claims, 3 Drawing Sheets

LAMP DRIVING DEVICE WITH OPEN VOLTAGE CONTROL

BACKGROUND OF THE INVENTION

1. Field of the Invention

The present invention relates to a lamp driving device with an open voltage control and, more particularly, to a lamp driving device using a current detector to detect an operation of the lamp and stopping the operation of the lamp when it detects that the lamp circuit has opened abnormally.

2. Description of the Prior Art

Please refer to FIG. 1 for an implementation view of a prior art lamp driving device with an open voltage control. As shown in the figure, the lamp driving device with an open voltage control 1 uses a DC power source 11 to provide a DC signal to a square wave switch 12, the square wave switch 12 provides a square wave signal to an LC resonant circuit 14, and then the LC resonant circuit 14 provides a sinusoidal wave signal to a driver transformer 13 for the driver transformer 13 to drive a lamp 15. With this structure, it is common to set two capacitive elements 16 between a secondary side of the driver transformer 13 and the lamp 15, and to use a voltage dividing scheme to feedback a control signal to a square wave controller 17 for overvoltage protection. Although the above mechanism can provide overvoltage protection, it still presents some shortcomings such as:

1. The prior art technique uses capacitors to divide voltage so as to achieve the above object, however, since high voltage capacitors cost more than ordinary capacitors, they tend to increase the total cost of the lamp driving device.
2. In the prior art structure, the choice of the capacitive elements can greatly affect the stability of the overall lamp driving device.

Therefore, it is desirable to overcome these shortcomings with the above-mentioned traditional lamp driving device.

In view of the above-described deficiencies of traditional lamp driving device, after years of constant effort in research, the inventor of this invention has consequently developed a new lamp driving device with an open voltage control described in the present invention.

SUMMARY OF THE INVENTION

It is an object of the present invention to provide a lamp driving device with an open voltage control, which uses a current detector circuit to replace prior art capacitor-based voltage divider to reduce the cost of the prior art lamp driving device due to the high cost of capacitors.

It is another object of the present invention to provide the lamp driving device with an open voltage control, which uses the current detector to detect abnormal operations of the lamp, and if the lamp is found open-circuit, a PWM control pin will control the square wave controller to stop the operation of the lamp driving device, thereby enhancing safety in using the lamp.

It is another object of the present invention to provide the lamp driving device with an open voltage control, which not only enhances the safety in using the lamp and reduces the device cost, but also extends the lifetime of the lamp driving device and saves installation space of the lamp driving device.

In order to achieve the above objects, the present invention provides a lamp driving device with an open voltage control, wherein the lamp driving device comprises a DC power source, a square wave switch, a square wave controller, an LC resonant circuit, a driver transformer and a current detector. The lamp driving device uses the square wave switch to output a square wave signal to the LC resonant circuit, the LC resonant circuit converts the square wave signal into a sinusoidal wave signal and outputs the sinusoidal wave signal to the driver transformer, and finally the lamp driving device uses the driver transformer to drive the lamp and uses the current detector to detect the operation of the lamp, and if the lamp is found open-circuit, a PWM control pin will control the square wave controller to stop the operation of the lamp driving device immediately, thereby enhancing the safety in using the lamp.

DETAILED DESCRIPTION OF THE PREFERRED EMBODIMENT

Figure 1:
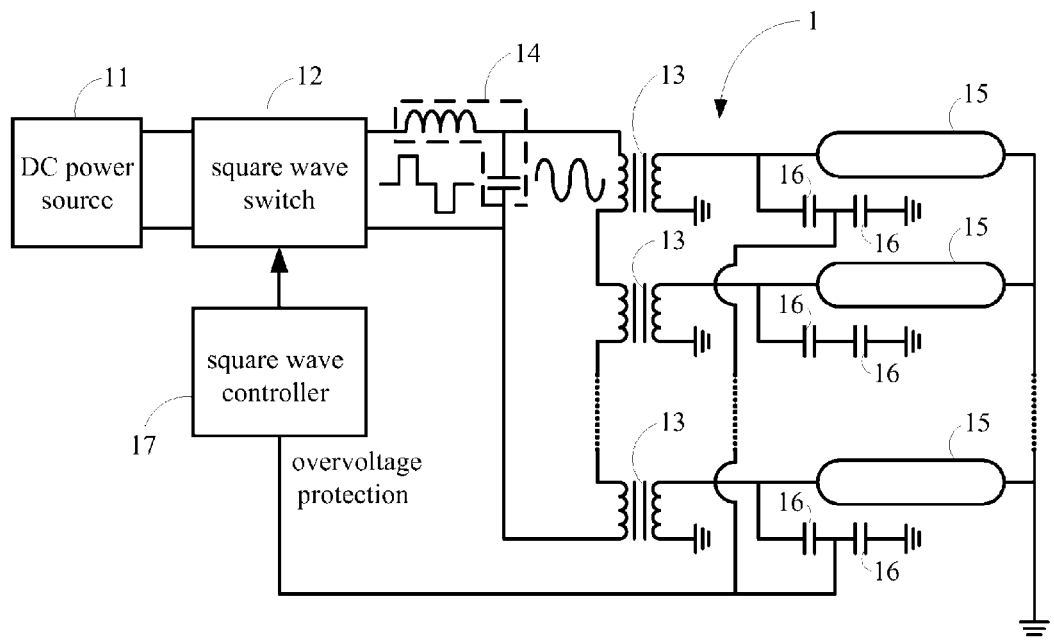
FIG. 1 illustrates an implementation view of a prior art lamp driving device with an open voltage control.
Figure 2:
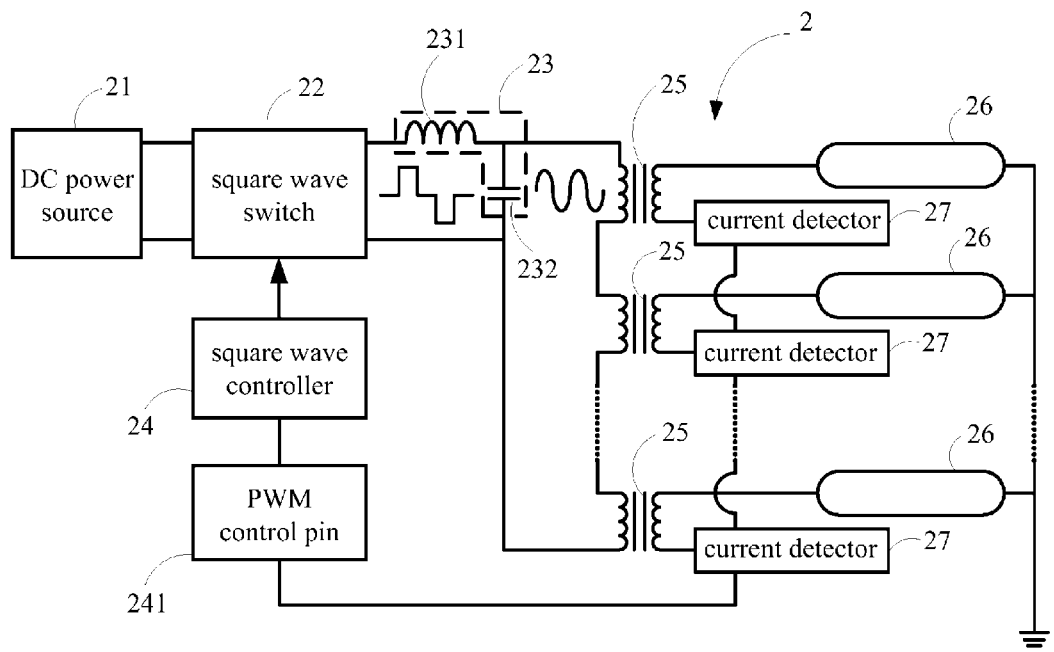
FIG. 2 illustrates a first embodiment of a lamp driving device with an open voltage control in accordance with the present invention.

Please refer to FIG. 2 for a first embodiment of a lamp driving device with an open voltage control in accordance with the present invention. As shown in the figure, the present invention provides a lamp driving device with an open voltage control 2, which comprises: a DC power source 21, a square wave switch 22, an LC resonant circuit 23, a square wave controller 24, a driver transformer 25, and a current detector 27.

The DC power source 21 provides a DC signal to the square wave switch 22.

The square wave switch 22 converts the DC signal from the DC power source 21 into a square wave signal and outputs the square wave signal to the LC resonant circuit 23; the square wave switch 22 also receives a control signal from the square wave controller 24 to control the amplitude of the square wave signal.

The LC resonant circuit 23 consists of an inductive element 231 and a capacitive element 232 for converting the square wave signal from the square wave switch 22 into a sinusoidal wave signal and then outputs the sinusoidal wave signal to the driver transformer 25.

The driver transformer 25 converts the sinusoidal wave signal and outputs the converted signal to a lamp 26 to drive the lamp 26.

The current detector 27 is disposed between a secondary side of the driver transformer 25 and the square wave controller 24 for detecting an abnormal operation of the lamp 26; if the lamp 26 operates abnormally, the current detector 27 outputs a control signal to a PWM control pin 241 of the square wave controller 24;

The square wave controller 24 receives the control signal from the current detector 27 through the PWM control pin 241 and adjusts the square wave signal of the square wave switch 22 based on the control signal received.

Figure 3:
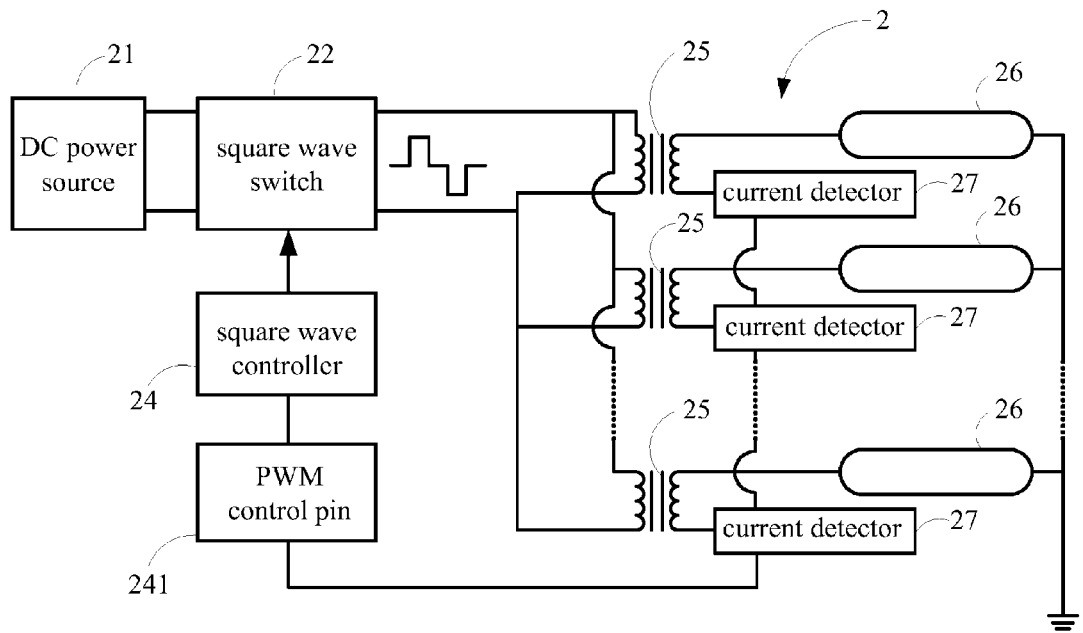
FIG. 3 illustrates a second embodiment of the lamp driving device with an open voltage control in accordance with the present invention.

Please refer to FIG. 3 for a second embodiment of the lamp driving device with an open voltage control in accordance with the present invention. As shown in the figure, the only difference between the second embodiment and first embodiment is that the LC resonant circuit is omitted in the second embodiment, and the square wave switch 22 directly outputs the square wave signal to the driver transformer 25 for the driver transformer 25 to convert the square wave signal into a sinusoidal wave signal to drive the lamp 26 by means of a leak inductance of the driver transformer 25 and a stray capacitor of the lamp 26.

Figure 4:
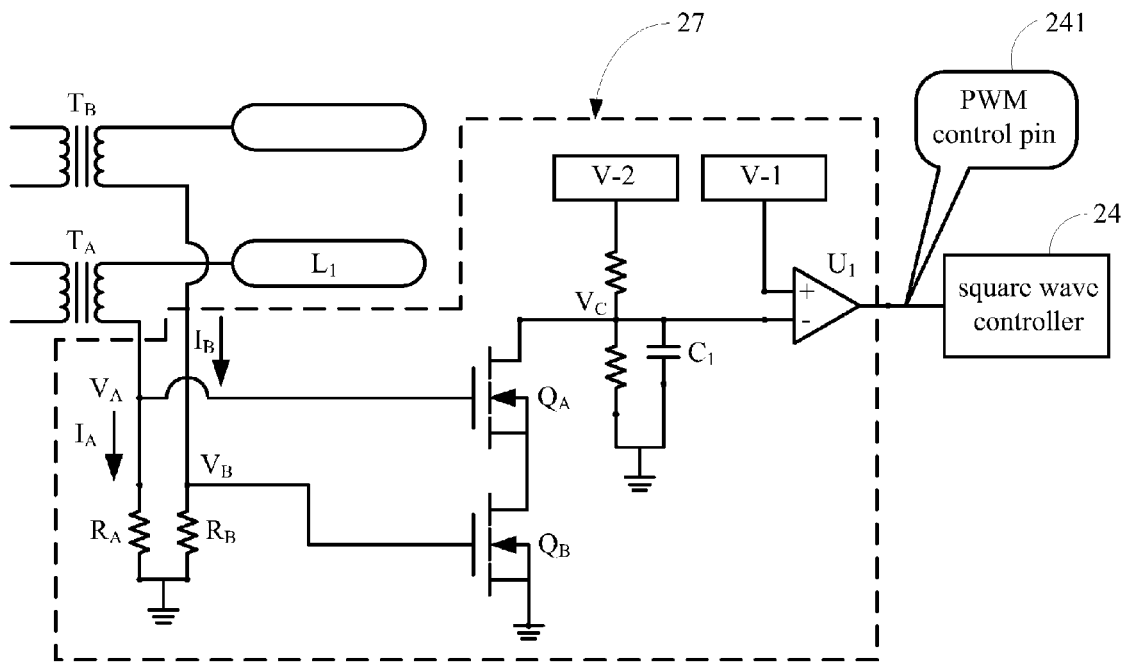
FIG. 4 illustrates a circuit implementation of a current detector in accordance with the present invention.

Please refer to FIG. 4 for a circuit implementation of a current detector in accordance with the present invention, wherein the operating principle of the current detector 27 is as follows.

1. When the lamp operates normally,
    A. the transformer $T_A$ will generate the current $I_A$ and the voltage drop $V_A$ occurs when it flows through the resistor $R_A$ and the voltage drop $V_B$ occurs when it flows through the resistor $R_B$;
    B. the voltage $V_A$ turns on the switch $Q_A$ and the voltage $V_B$ turns on the switch $Q_B$;
    C. since the switch $Q_A$ and $Q_B$ turn on at the same time, the voltage level of the voltage $V_C$ will be lower than that of the reference voltage V-1, so the comparator $U_1$ will not output any control signal to the PWM control pin 241 of the square wave controller 24; and
    D. the lamp driving device will operate normally; meanwhile, the lamp will operate normally.
2. When the lamp is found open-circuit
    A. when the lamp $L_1$ fails to operate normally, the transformer $T_A$ will not generate the current $I_A$ and therefore no voltage drop $V_A$ occurs;
    B. the switch $Q_A$ will not turn on due to the absence of the voltage drop $V_A$; meanwhile the reference voltage V-2 continues to charge the capacitor $C_1$ to gradually increase the voltage level of the voltage $V_C$;
    C. when the voltage level of the voltage $V_C$ is higher than that of the reference voltage V-1, the comparator $U_1$ will output a control signal to the PWM control pin 241 of the square wave controller 24; and
    D. the lamp driving device will stop operating in response to the control signal to ensure the stability of the lamp driving device and the safety in using the lamp.

Figure 5:
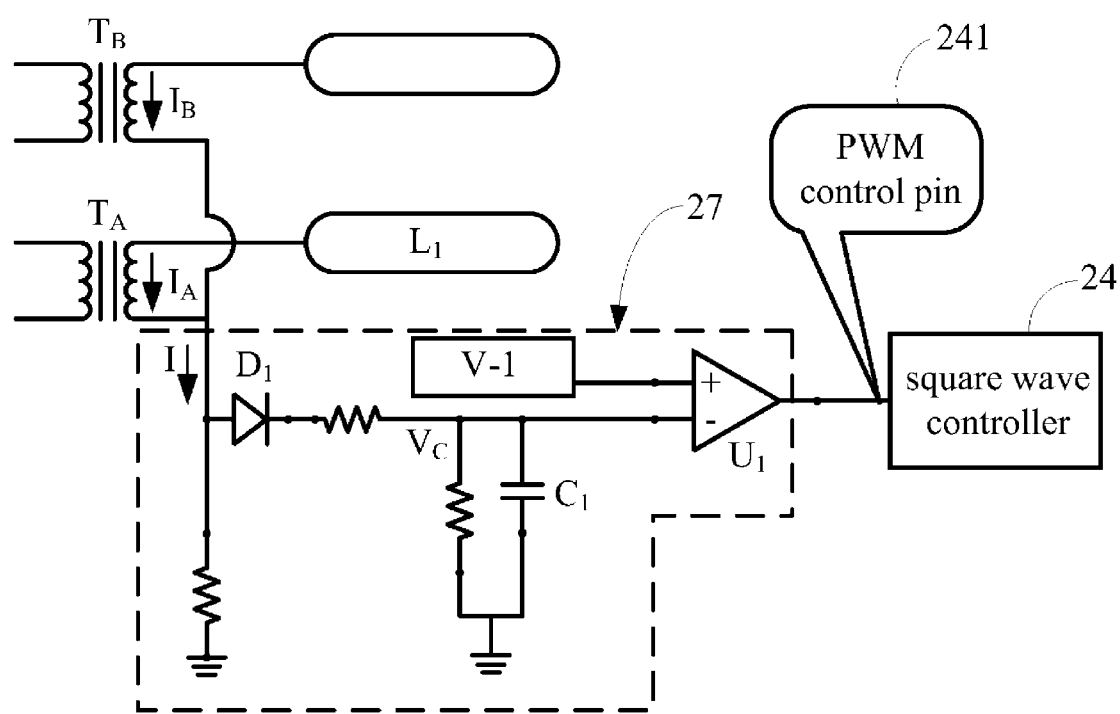
FIG. 5 illustrates another circuit implementation of the current detector in accordance with the present invention.

Please refer to FIG. 5 for another circuit implementation of the current detector in the present invention, wherein the current detector 27 can be a peak clamping circuit, and the operating principle of the current detector 27 is as follows.

1. When the lamp operates normally,
    A. the transformer $T_A$ and the transformer $T_B$ have opposite phases to each other, so the net current I derived from the sum of the current $I_A$ at the secondary side of the transformer $T_A$ and the current $I_B$ at the secondary side of the transformer $T_B$ will be zero;
    B. since the net current I is zero, the diode $D_1$ is not turned on, the voltage level of the voltage $V_C$ is lower than that of the reference voltage V-1, so the comparator U1 will not output any control signal to the PWM control pin 241 of the square wave controller 24; and
    C. the lamp driving device will operate normally; meanwhile, the lamp will operate normally.
2. When the lamp is found open-circuit,
    A. when the lamp $L_1$ fails to operate normally, the transformer $T_A$ will not generate the current $I_A$ and therefore the net current I derived from the sum of the current $I_A$ at the secondary side of the transformer $T_A$ and the current $I_B$ at the secondary side of the transformer $T_B$ will not be zero;
    B. since the net current I is not zero, the diode $D_1$ is turned on and continues to charge the capacitor $C_1$ to gradually increase the voltage level of the voltage $V_C$;
    C. when the voltage level of the voltage $V_C$ is higher than that of the reference voltage V-1, the comparator $U_1$ will output a control signal to the PWM control pin 241 of the square wave controller 24; and
    D. the lamp driving device will stop operating in response to the control signal to ensure the stability of the lamp driving device and the safety in using the lamp.

The present invention provides a lamp driving device with an open voltage control, which, when compared with other traditional lamp driving devices, is advantageous in the following aspects:

1. The present invention provides a lamp driving device with an open voltage control, which uses a current detector circuit to replace prior art capacitor-based voltage divider to reduce the cost of the prior art lamp driving device due to the high cost of capacitors.
2. The present invention provides the lamp driving device with an open voltage control, which uses the current detector to detect an abnormal operation of the lamp, and if the lamp is found open-circuit, a PWM control pin will control the square wave controller to stop the operation of the lamp driving device, thereby enhancing the operating stability of the lamp driving device.
3. The present invention provides the lamp driving device with an open voltage control, which not only enhances the operating stability of the lamp driving device and reduces device cost, but also extends the lifetime of the lamp driving device and saves installation space of the lamp driving device Many changes and modifications in the above described embodiment of the invention can, of course, be carried out without departing from the spirit thereof. Accordingly, the invention is disclosed and is intended to be limited only by the appended claims.

What is claimed is:

1. A lamp driving device with an open voltage control, comprising:
    a DC power source for providing a DC signal to a square wave switch;
    the square wave switch for converting the DC signal from the DC power source into a square wave signal and outputting the square wave signal to an LC resonant circuit; the square wave switch also receiving a control signal from a square wave controller to control an amplitude of the square wave signal;
    the LC resonant circuit for converting the square wave signal from the square wave switch into a sinusoidal wave signal and then outputting the sinusoidal wave signal to a driver transformer;
    the driver transformer for converting the sinusoidal wave signal to drive the lamp;
    a current detector disposed between a secondary side of the driver transformer and the square wave controller for detecting an abnormal operation of the lamp, if the lamp operates abnormally, the current detector outputting a control signal to a PWM control pin of the square wave controller; and
    the square wave controller for receiving the control signal from the current detector through the PWM control pin and adjusting the square wave signal of the square wave switch based on the control signal,
    wherein the current detector uses a switch element to detect the current flowing through the secondary side of the driver transformer and the lamp, if the lamp operates abnormally, then the switch element is set to be open-circuit to let the current flow to a capacitive element instead and to charge the capacitive element, when a voltage of the capacitive element exceeds a reference voltage of a comparator, the comparator outputs the control signal to the square wave controller.

2. A lamp driving device with an open voltage control, comprising:

a DC power source for providing a DC signal to a square wave switch;

the square wave switch for converting the DC signal from the DC power source into a square wave signal and outputting the square wave signal to an LC resonant circuit; the square wave switch also receiving a control signal from a square wave controller to control an amplitude of the square wave signal;

the LC resonant circuit for converting the square wave signal from the square wave switch into a sinusoidal wave signal and then outputting the sinusoidal wave signal to a driver transformer;

the driver transformer for converting the sinusoidal wave signal to drive the lamp;

a current detector disposed between a secondary side of the driver transformer and the square wave controller for detecting an abnormal operation of the lamp, if the lamp operates abnormally, the current detector outputting a control signal to a PWM control pin of the square wave controller; and the square wave controller for receiving the control signal from the current detector through the PWM control pin and adjusting the square wave signal of the square wave switch based on the control signal, wherein the current detector is designed to let the sum of the currents flowing through the secondary side of the driver transformer and the lamp to be zero, therefore no net current is flowing through a peak clamping circuit, if the lamp operates abnormally, then the sum of all the currents flowing through the secondary side of the driver transformer and the lamp is not zero, the net current flows to the peak clamping circuit to charge the capacitive element therein, when a voltage of the capacitive element exceeds a reference voltage of a comparator, the comparator outputs the control signal to the square wave controller.

3. A lamp driving device with an open voltage control, comprising:

a DC power source for providing a DC signal to a square wave switch;

a square wave switch for converting the DC signal from the DC power source into a square wave signal and outputting the square wave signal to a driver transformer; the square wave switch also receiving a control signal from a square wave controller to control an amplitude of the square wave signal;

the driver transformer using a leak inductance and a stray capacitor for converting the square wave signal into a sinusoidal wave signal to drive the lamp;

a current detector disposed between a secondary side of the driver transformer and the square wave controller for detecting an abnormal operation of the lamp, if the lamp operates abnormally, the current detector outputting a control signal to a PWM control pin of the square wave controller; and the square wave controller for receiving the control signal from the current detector through the PWM control pin and adjusting the square wave signal of the square wave switch based on the control signal, wherein the current detector uses a switch element to detect the current flowing through the secondary side of the driver transformer and the lamp, if the lamp operates abnormally, then the switch element is set to be open-circuit to let the current flow to a capacitive element instead and to charge the capacitive element, when a voltage of the capacitive element exceeds a reference voltage of a comparator, the comparator outputs the control signal to the square wave controller.

4. A lamp driving device with an open voltage control, comprising:

a DC power source for providing a DC signal to a square wave switch;

a square wave switch for converting the DC signal from the DC power source into a square wave signal and outputting the square wave signal to a driver transformer; the square wave switch also receiving a control signal from a square wave controller to control an amplitude of the square wave signal;

the driver transformer using a leak inductance and a stray capacitor for converting the square wave signal into a sinusoidal wave signal to drive the lamp;

a current detector disposed between a secondary side of the driver transformer and the square wave controller for detecting an abnormal operation of the lamp, if the lamp operates abnormally, the current detector outputting a control signal to a PWM control pin of the square wave controller; and the square wave controller for receiving the control signal from the current detector through the PWM control pin and adjusting the square wave signal of the square wave switch based on the control signal, wherein the current detector is designed to let the sum of all the currents flowing through the secondary side of the driver transformer and the lamp to be zero, therefore no net current is flowing through a peak clamping circuit, if the lamp operates abnormally, then the sum of the currents flowing through the secondary side of the driver transformer and the lamp is not zero, the net current flows to the peak clamping circuit to charge the capacitive element therein, when a voltage of the capacitive element exceeds a reference voltage of a comparator, the comparator outputs the control signal to the square wave controller.

* * * * *